Oct. 5, 1937.  A. HESSELRODE  2,094,945
STEERING KNUCKLE
Filed April 2, 1937

Inventor
Arthur Hesselrode
By Clarence A. O'Brien
Hyman Berman
Attorneys

Patented Oct. 5, 1937

2,094,945

UNITED STATES PATENT OFFICE 2,094,945

STEERING KNUCKLE

Arthur Hesselrode, Broseley, Mo.

Application April 2, 1937, Serial No. 134,687

2 Claims. (Cl. 280—96.1)

My invention relates to improvements in steering knuckles for vehicles, and the primary object thereof is the provision of a device of this character in which friction is reduced to a negligible degree whereby steering is facilitated and wear with consequent shimmying is obviated.

Another object is to provide a steering knuckle which is strong and durable, comparatively inexpensive to manufacture, and reliable in operation.

To the accomplishment of the above, and subordinate objects presently appearing, the preferred embodiment of my invention has been illustrated in the accompanying drawing, set forth in detail in the following description, and defined in the claims appended hereto.

In said drawing:—

Figure 1:
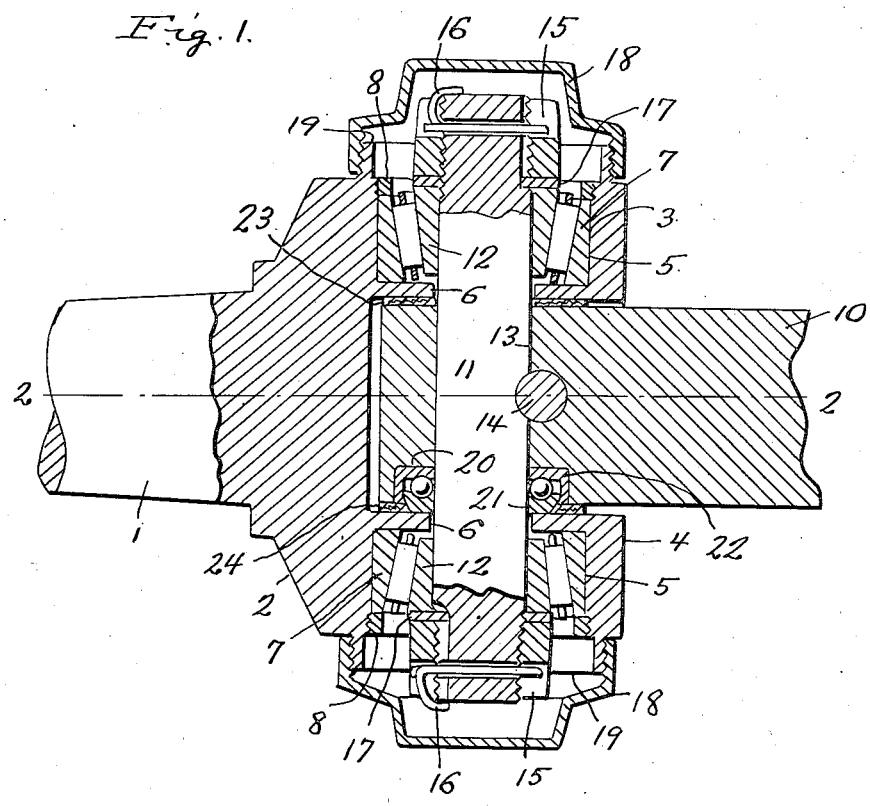
Figure 2:
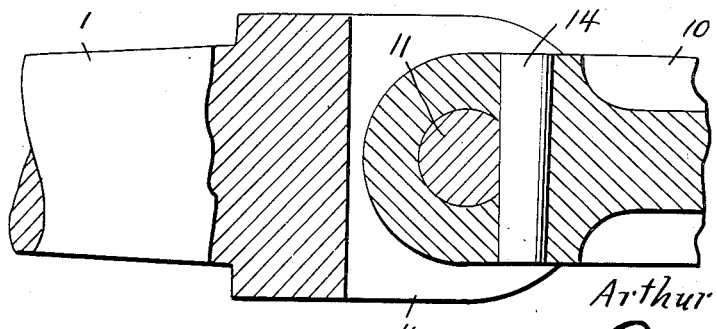

Figure 1 is a view in vertical section, parts showing in elevation, of my improved steering knuckle, and Figure 2 is a view in horizontal section taken on the line 2—2 of Figure 1.

Referring by numerals to the drawing, according to my invention the usual wheel spindle 1 is provided with a yoke-like end 2 comprising upper and lower yoke arms 3 and 4, respectively. Each arm 3 and 4 has formed in its outer side a circular countersink or recess 5, said recesses being axially aligned and the bottoms thereof each being provided with an axial aperture 6 therein. A pair of conical or tapered roller bearing units 7 are fitted into said recesses 5, respectively, said units being oppositely tapered, relatively, and each secured in its respective recess 5 by a locking ring 8 threaded into the outer end of the related recess against the outer race member 9 of the unit. The end of the axle 10 is mounted between the yoke arms 3 and 4 by means of a spindle bolt 11 passing through the inner race members 12 of the bearing units 7, apertures 6, and a bore 13 in said end of the axle 10. The axle 10 is keyed to the spindle bolt 11 by a key member 14. The ends of the spindle bolt 11 extend beyond the bearing units 7 and are threaded to receive nuts 15 opposed to the inner race members 12 and locked to the spindle bolt 11 by the usual cotter pins 16. Washers 17 are interposed between the nuts 15 and the race members 12 if desired. Dust caps 18 are threaded on to annular flanges 19 on the outer sides of the arms 3 and 4 and concentric to the recesses 5.

Intermediate the lower yoke arm 4 and the axle 10 is an end thrust ball bearing unit 20 through which the spindle bolt 11 extends and comprising an inner lower race member 21 bearing against said arm 4 and an upper or outer race member 22 countersunk in the lower side of the axle 10. The axle 10 is spaced slightly from the yoke arms 3 and 4 on its lower side by the end thrust bearing unit 20. Upper and lower fiber washers 23 and 24 are interposed between the arms 3 and 4 and the axle 10, the upper washer 23 surrounding the spindle bolt 11 and the lower washer 24 surrounding the inner lower race member 21 of the end thrust bearing 20.

As will now be manifest relative end thrust movement of the yoke end 2 and the spindle bolt 11 is obviated by the oppositely tapering bearing units 7 which are readily adjustable through the medium of the rings 8 and nuts 15 as occasion may require. Also the bearing units 7 and 20 provide for reducing friction in turning of the spindle 2 so that wear incident to steering is reduced to a negligible degree.

The construction, operation and advantages of my improved steering knuckle will, it is believed, be clear from the foregoing description thereof.

Manifestly modifications in details described may be resorted to without departing from the inventive concept and right is herein reserved to all such modifications falling within the scope of the claims appended hereto.

What I claim is:—

1. A steering knuckle for vehicles comprising, in combination with a spindle and an axle, a yoke-like end on the spindle forming upper and lower yoke arms receiving one end of the axle therebetween, said arms each having a circular countersink in their outer side and an annular flange on said side surrounding the countersink, a spindle bolt passing through said arms axially of said countersinks and through said axle end, a key in said axle end fixedly securing said bolt therein, a pair of tapered roller bearing units for opposite ends of said bolt, respectively, fitted into said countersinks and having inner race members, respectively, secured to said bolt, a thrust bearing unit intermediate said axle end and the lower yoke arm and surrounding said spindle bolt, and dust caps threaded onto said flanges.

2. A steering knuckle for vehicles comprising, in combination with a spindle and an axle, a yoke-like end on the spindle forming upper and lower yoke arms receiving one end of the axle therebetween, said arms each having a circular countersink in their outer sides and an annular flange on said side surrounding the countersink, a spindle bolt passing through said arms axially of said countersinks and through said axle end, a key in said axle end fixedly securing said bolt therein, a pair of tapered roller bearing units for opposite ends of said bolt, respectively, fitted into said countersinks and having inner race members, respectively, secured to said bolt, a thrust bearing unit intermediate said axle end and the lower yoke arm and surrounding said spindle bolt, dust caps threaded onto said flanges, and fiber washers surrounding said bolt intermediate said axle end and said arms.

ARTHUR HESSELRODE.